UNITED STATES PATENT OFFICE.

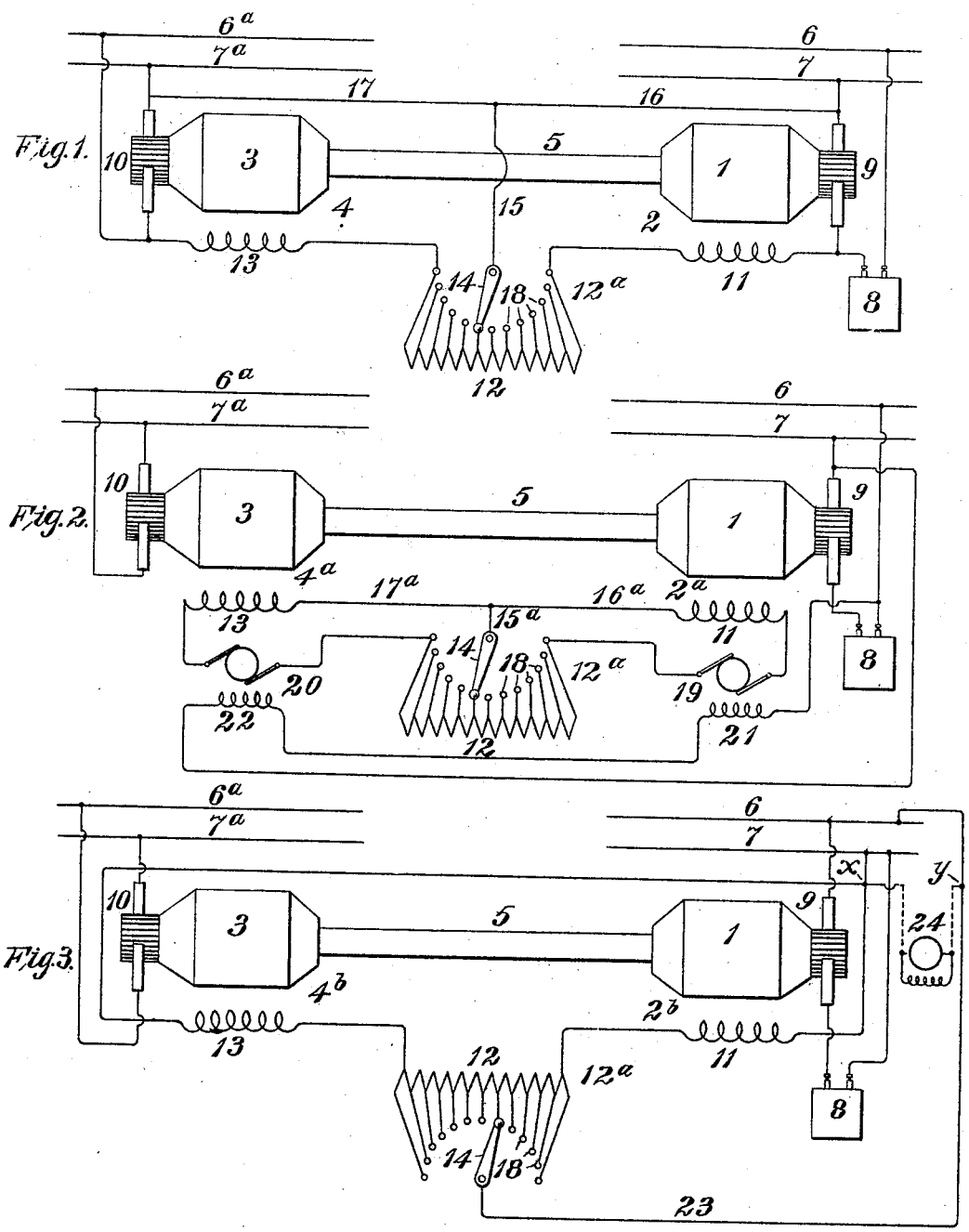

JAMES EDGAR MILLER, OF EDGEWOOD PARK, PENNSYLVANIA, ASSIGNOR TO THE WESTINGHOUSE ELECTRIC & MANUFACTURING COMPANY, OF PENNSYLVANIA.

MECHANISM FOR GENERATING VARIABLE ELECTROMOTIVE FORCE.

SPECIFICATION forming part of Letters Patent No. 680,798, dated August 20, 1901.

Application filed March 1, 1900. Serial No. 7,007. (No model.)

*To all whom it may concern:*

Be it known that I, JAMES EDGAR MILLER, a citizen of the United States of America, residing at Edgewood Park, in the county of Allegheny and State of Pennsylvania, have invented an Improvement in Mechanism for Generating Variable Electromotive Force, of which the following is a specification.

My invention relates to the generation of electrical energy; and it has for its object to provide a simple and efficient means for generating electrical energy the electromotive force of which may be varied within wide limits.

With this end in view I have devised the mechanism shown in the accompanying drawings, in which—

Figure 1 is a diagram of apparatus and circuits suitable for practicing my invention. Fig. 2 is a view similar to Fig. 1, but embodying a modified construction; and Fig. 3 is a view similar to Figs. 1 and 2, but showing a further modification.

It sometimes becomes necessary or desirable to supply electrical energy to translating devices at a variable potential when the only source of energy conveniently available supplies a constant or approximately constant electromotive force. A familiar example is found in the charging of secondary batteries from a constant-potential electric lighting or power circuit, it being necessary in the charging of batteries to raise the potential of the charging-circuit as the charging operation proceeds, the ultimate potential, provided the batteries are charged to substantially their full capacity, being very much higher than that required when the batteries are approximately free of charge. In order to meet the requirements of such conditions, I propose to employ substantially the means which will now be described, reference being first had to Fig. 1 of the drawings, in which the armature 1 of a direct-current motor 2 is mechanically connected to the armature 3 of a similar generator 4. This connection between the armatures of the generator and motor may be by means of belts and pulleys or other form of gearing, or the connection may be made direct by mounting the two armatures on a single shaft 5, as indicated, or by coupling the shafts together either rigidly or by a flexible coupling in a manner well known in the art. The armature 1 of the motor 2 is supplied with energy from a suitable source of approximately constant electromotive force through conductors 6 and 7, which may represent the bus-bars of a switchboard, the usual starting-box 8, and a commutator 9. The generator 4 supplies energy to conductors $6^a$ and $7^a$, which may be switchboard bus-bars or other conductors, to which the translating devices to receive the energy from the said generator are connected. The connection between the generator-armature 3 and the conductors $6^a$ and $7^a$ is made by means of a commutator 10 in the usual manner. The field-magnet of the motor 2 is provided with a shunt-winding 11, one terminal of which is connected to the positive brush of the commutator 9 and the other terminal of which is connected to one terminal of a variable resistance 12 of a rheostat $12^a$. The other terminal of the resistance 12 is connected to one terminal of the shunt field-magnet winding 13 of the generator 4, the other terminal of said winding being connected to the positive brush of the commutator 10 and to the conductor $6^a$. The switch-arm 14 of the rheostat $12^a$ is connected with the negative brush of the commutator 9 of the motor 2 by means of conductors 15 and 16 and with the negative brush of the commutator 10 of the generator 4 by means of conductors 15 and 17. The rheostat switch-arm 14 is movable over the stationary contact-terminals 18 of the rheostat, and by reason of the connections of the resistance-terminals with the terminals of the field-magnet windings 11 and 13 the entire resistance of the rheostat may be included in circuit with one of the field-magnet windings, or any desired amount may be included in circuit with one of such windings, and the remainder will necessarily be included in circuit with the other field-magnet winding.

The arrangement of apparatus shown provides two means which coöperate to vary the electromotive force supplied to the conductors $6^a$ and $7^a$, since the adjustment of the rheostat so as to increase the resistance of the circuit including the winding 11 will result in an increased speed of the motor-armature 1, which will increase the electromotive force supplied by the generator 4, and the adjustment of the rheostat to increase the resistance of the winding 11 will effect a corresponding decrease of the resistance of the circuit of winding 13, and consequently insure an increase of exciting-current through the winding 13, which will raise the electromotive force of the generator. It follows, therefore, that if the apparatus is properly designed a maximum adjustment of the rheostat will insure an extremely wide range in the electromotive force supplied by the generator 4.

In Fig. 2 of the drawings I have shown my invention as practiced by means of a generator and a motor the field-magnets of which are separately excited. The apparatus and circuits shown in Fig. 2 are the same as those shown in Fig. 1, except in so far as modifications are necessary in order to effect the separate excitation above mentioned, and the description given in connection with Fig. 1 may be read in connection with Fig. 2, except as regards the features to be now specifically described.

The field-magnet winding 11 of the motor $2^a$ is supplied with exciting-current from a small generator 19, a greater or less amount of the rheostat resistance 12 being connected in circuit with said winding and the armature of said exciter through the switch-arm 14, one of the contact-terminals 18, and the conductors $15^a$ and $16^a$. The field-magnet winding 13 of the generator $4^a$ is similarly supplied with energizing-current by the exciter 20, the circuit of said field-magnet winding and exciter-armature being completed through more or less of the rheostat resistance 12 by means of the switch-arm 14, contact-terminals 18, and conductors $15^a$ and $17^a$. The field-magnet windings 21 and 22 for the respective exciters 19 and 20 are connected in series across the constant-potential conductors 6 and 7.

It will be readily seen without further description that the weakening of the field of the motor $2^a$ by adjusting the switch-arm 14 of the rheostat to increase the amount of resistance in the winding 11 will result in a speeding up of the motor, and consequently of the generator $4^a$ driven thereby, that such weakening of the field of the motor will be accompanied by a corresponding strengthening of the field of the generator, and that the increased speed of the generator and the increased strength of its field will coöperate to raise the electromotive force supplied by it to the conductors $6^a$ and $7^a$, and thus insure as wide variations of electromotive force as may be desired. The reverse operation, whereby the generator electromotive force is decreased, is obvious.

In Fig. 3 of the drawings is shown a further modification, in which the motor $2^b$ and the generator $4^b$ have shunt-wound field-magnets, the arrangement of circuits being, however, somewhat different from those shown in Fig. 1. Many of the parts are the same as have already been described in detail in connection with Fig. 1, and the description heretofore given may therefore be read in connection with Fig. 3, the only additional description necessary being with relation to added or modified features. In this form of my invention the adjacent terminals of the field-magnet windings 11 and 13 are respectively connected to the ends of the rheostat resistance 12, and the positive terminals are connected to the conductor 7, they being shown as joined together at the point X, from which a single conductor leads to the conductor 7, though obviously the specific arrangement of conductors shown is not essential. The rheostat switch-arm 14 is connected by means of conductor 23 to the main conductor 6. It will be readily understood that the operation of this apparatus is in all essential particulars like that of each of the forms of my invention already described.

In case it is desired to employ substantially the arrangement of circuits shown in Fig. 3, but to separately excite the field-magnets of the machines $2^b$ and $4^b$ instead of making them self-exciting, I may employ a small exciter 24 and connect it by means of the conductors indicated in the broken lines to the circuits of the field-magnet windings 11 and 13 at the points X and Y. In such case the conductors between the points X and Y and the corresponding main conductors 7 and 6 would obviously be omitted.

In each of the modifications herein shown and described the energizing-currents for the field-magnets of the generator and motor flow through the switch-arm of the rheostat in the same direction, and consequently such currents flow in opposite directions in the complementary portions of the resistance 12.

While I have illustrated and described certain apparatus and combinations and arrangements of circuits, I desire it to be understood that my invention is not necessarily limited to what is specifically illustrated in the drawings and described in the specification, the only limitations intended being those specified in the claims.

I claim as my invention—

1. Means for producing a variable electromotive force comprising an electric motor driven from an approximately constant-potential circuit, a generator mechanically connected to and driven by said motor, and means for increasing the field-magnet strength of the generator and decreasing that of the motor simultaneously, and vice versa.

2. The combination with a direct-current motor having its armature connected to a source of approximately constant potential, of a generator having its armature mechanically connected to that of the motor, and means for inversely varying the resistance of the field-magnet circuits of said machines.

3. The combination with a generator and a motor having their armatures mechanically connected together, of means for supplying the motor-armature with energy at an approximately constant potential, a variable resistance connected in circuit with the field-magnets of both machines, and means for adjusting such resistance so as to cut the same progressively out of the circuit of one field-magnet winding and into the circuit of the other.

4. The combination with a generator and a motor having their armatures mechanically connected together, and having their field-magnet windings electrically connected in opposition through complementary portions of a variable resistance, means for supplying at least one of said field-magnet windings with exciting-current independently of the generator and means for adjusting the resistance so as to inversely vary the excitation of the two field-magnet windings.

5. The combination with two armatures mechanically connected together one of which receives and the other of which generates electrical energy, of separate field-magnets for said armatures the windings of which are connected in series through a resistance, and a bridge across said circuit embodying a switch-arm for transferring more or less of said resistance from one field-magnet circuit to the other.

6. The combination with two armatures mechanically connected together one of which is operated by electrical energy and the other of which generates such energy, of separate field-magnets for said armatures having windings connected in series through a resistance, and a bridge across the circuit of said windings comprising a switch-arm for progressively transferring said resistance from one field-magnet circuit to the other.

In testimony whereof I have hereunto subscribed my name this 28th day of February, 1900.

J. EDGAR MILLER.

Witnesses:
WESLEY G. CARR,
W. SUMNER SEIBERT.